United States Patent [19]

Kanno et al.

[11] 4,039,752

[45] Aug. 2, 1977

[54] FM FOUR CHANNEL STEREO SIGNAL GENERATOR

[75] Inventors: Masashi Kanno, Katano; Sukeichi Miki, Ikoma; Tsuneo Takezaki, Neyagawa; Syuichi Ninomiya, Kadoma, all of Japan

[73] Assignee: Matsushita Electric Industrial Co., Ltd., Japan

[21] Appl. No.: 615,088

[22] Filed: Sept. 19, 1975

[51] Int. Cl.[2] ........................... H04H 5/00; H04J 3/02

[52] U.S. Cl. ................................................ 179/15 BT

[58] Field of Search ..... 179/15 BT, 1 GQ, 100.1 TD, 179/100.4 ST; 325/148; 331/25

[56] References Cited

U.S. PATENT DOCUMENTS

| | | | |
|---|---|---|---|
| 3,231,820 | 1/1966 | Cayzac | 325/148 |
| 3,259,856 | 7/1966 | Bott | 325/148 |
| 3,708,623 | 1/1973 | Dorren | 179/15 BT |
| 3,805,183 | 4/1974 | Lance | 331/25 |
| 3,902,019 | 8/1975 | Bruene | 179/15 BT |
| 3,921,094 | 11/1975 | Schaible | 331/25 |
| 3,932,821 | 1/1976 | McClaskey | 331/25 |

*Primary Examiner*—Douglas W. Olms

*Attorney, Agent, or Firm*—Wenderoth, Lind & Ponack

[57] ABSTRACT

This invention provides an FM four channel stereo signal generator for generating from four stereophonically related audio signals an FM four channel stereo signal expressed by $(S_1+S_2+S_3+S_4)+(S_1+S_2-S_3-S_4)\sin\omega t+(S_1-S_2-S_3+S_4)\cos\omega t+$pilot signals with or without $(S_1-S_2+S_3-S_4)\sin 2\omega t$. The generator includes a matrixing device for producing from the four audio signals four matrixed audio signals $(aS_1+bS_2+bS_3+cS_4)$, $(bS_1+aS_2+CS_3+bS_4)$, $(bS_1+cS_2+aS_3+bS_4)$ and $(cS_1+bS_2bS_3+aS_4)$, where $2b=a+c$; a main gating circuit for producing from the audio or the matrixed audio signals a main gated signal including a four channel stereo signal and harmonics; and a subsidiary gating circuit for producing from the audio or the matrixed audio signals a subsidiary gated signal corresponding to a harmonic nearest the four channel stereo signal, whereby by combining the audio or the matrixed audio signals, the main and the subsidiary gated signals and the pilot signals, and by passing the thus combined signal through a low pass filter, the desired four channel stereo signal of high quality can be easily produced.

3 Claims, 13 Drawing Figures

15 23 38 53 61 76 91 99 114 129 175 190 205

15 23 38 53 61 76 91 175 190 205

99 175

15 23 38 53 99 114 129

61 99
FREQUENCY (KHz)

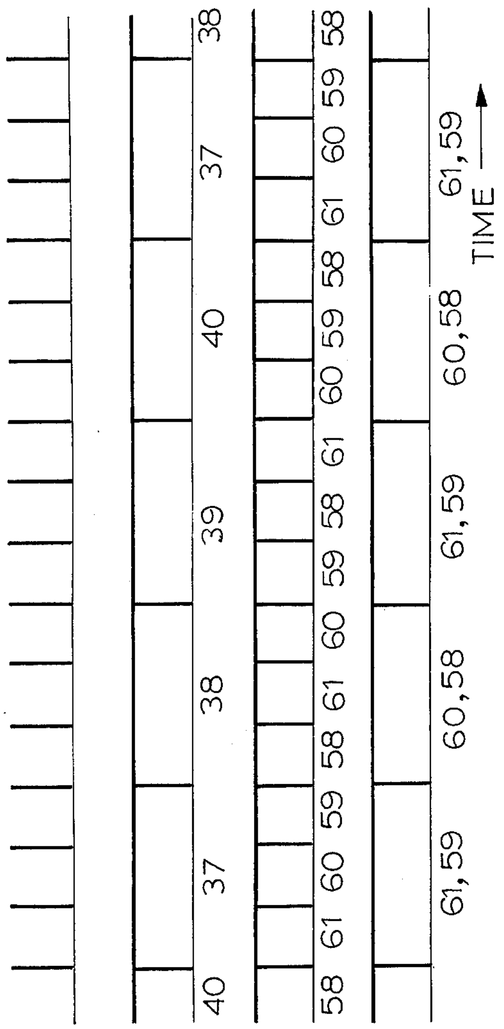
FIG.5a
FIG.5b
FIG.5c
FIG.5d
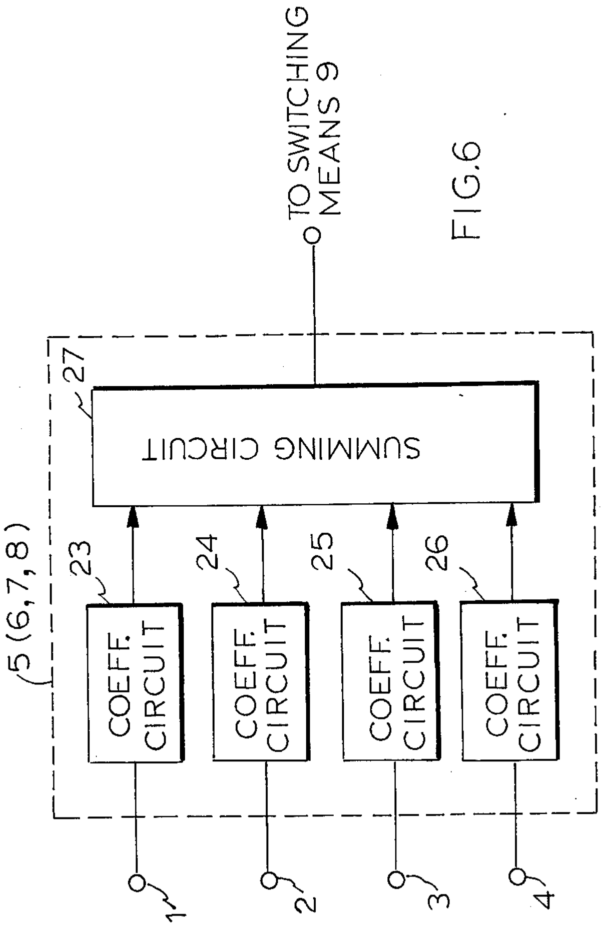
FIG.6

FM FOUR CHANNEL STEREO SIGNAL GENERATOR

This invention relates to an FM four channel stereo signal generator.

Various FM four channel stereo signals (composite signals or baseband signals) e.g. for an FM broadcasting have been suggested. One of them is shown in a co-pending U.S. application Ser. No. 244,093 and is expressed by the signal M(*t*) below.

$M(t) = A$ (main channel signal)
$+B \sin \omega t$ (first subsidiary channel signal)
$+C \cos \omega t$ (second subsidiary channel signal)
$+D \sin 2\omega t$ (third subsidiary channel signal)
$+P_1+P_2$ (pilot signals)...(1)

where *t* is time, $\omega=2\pi \times 38 \times 10^3$ rad/sec and $$A=S_1+S_2+S_3+S_4$$

$$B=S_1+S_2-S_3-S_4$$

$$C=S_1-S_2-S_3+S_4 \text{ and}$$

$$D=S_1-S_2S_3-S_4. \qquad (1')$$

These signals $S_1$, $S_2$, $S_3$ and $S_4$ are stereophonically related audio signals having a frequency band of 0 to 15 kHz and are usually $L_1$, $L_2$, $R_1$ and $R_2$ audio signals which are left front, left rear, right front and right rear audio signals, respectively.

If the signal M(*t*) is composed only of the main channel signal, it is a baseband signal for monaural broadcasting. If the signal M(*t*) is composed of the main channel signal and the first subsidiary channel signal, it is a baseband signal for two channel stereo broadcasting. If the signal M(*t*) is composed of the main channel signal, the first subsidiary channel signal and the second subsidiary channel signal, then it is a baseband signal for quasi-four channel (which is sometimes called three channel) stereo broadcasting. Further, if the signal M(*t*) is composed of all the main channel signal and the first, the second and the third subsidiary channel signals, it is a baseband signal for four channel (complete four channel) stereo broadcasting.

Two methods are known to generate the signal M(t). One method is a frequency division multiplex method, and separately produces the required channel signals e.g. by using a balanced modulator and combines them. The other method is a time division multiplex mehtod which produces the m(*t*) signal at one time e.g. by gating the four stereophonically related audio signals by using gates which gate at a predetermined time interval. This invention is concerned with this time division multiplex method.

The time division multiplex method is more advantageous than the frequency division multiplex method in that the modulation means can be composed simply of gates or switches which can easily have constant and uniform gating characteristics so that the relative level difference and phase difference between channel signals in the baseband can be made smaller than in the case of the frequency division multiplex method, and a stable and highly reliable M(*t*) signal can be easily obtained.

However, since the M(*t*) signal is obtained at one time according to the time division multiplex method, it is difficult to obtain all channel signals independently, particularly a quasi four channel stereo signal. Conventionally, in producing a quasi four channel stereo signal, the third subsidiary channel signal is attenuated by using a filter. However, it is extremely difficult to design a filter which can attenuate the third subsidiary channel signal without causing deterioration of the amplitude and phase characteristics of the first and the second subsidiary channel signals and to such an extent that a so-called SCA (subsidiary communication authorization) broadcasting signal used in the United States of America, which overlaps the third subsidiary channel signal and is sometimes used therefor, is not affected by the remaining component of the third subsidiary channel signal after the filter attenuation. This is because the highest component of the first and the second subsidiary channel signals is 53 kHz, and the lowest frequency component of the third subsidiary channel signal is 61 kHz, the frequency gap therebetween being thus too narrow.

It is an object of this invention to provide a FM four channel stereo signal generator of the time division multiplex method type by which a quasi four channel stereo signal can be easily produced.

It is another object of this invention to provide an FM four channel stereo signal generator of the time division multiplex method type by which a quasi four channel stereo signal of high quality can be obtained, and in obtaining the quasi four channel stereo signal, unwanted subsidiary channel signals or harmonics can be attenuated to a sufficiently great extent so as not to affect the SCA signal by using a conventional filter.

It is still another object of this invention to provide an FM four channel stereo signal generator of time division multiplex method type by which pilot signals having a high phase accuracy can be added to the stereo signal.

The manner in which these objects are achieved and a preferred embodiment of the FM four channel stereo signal generator according to this invention will be described hereinafter with reference to the accompanying drawings, in which.

Figure 1:
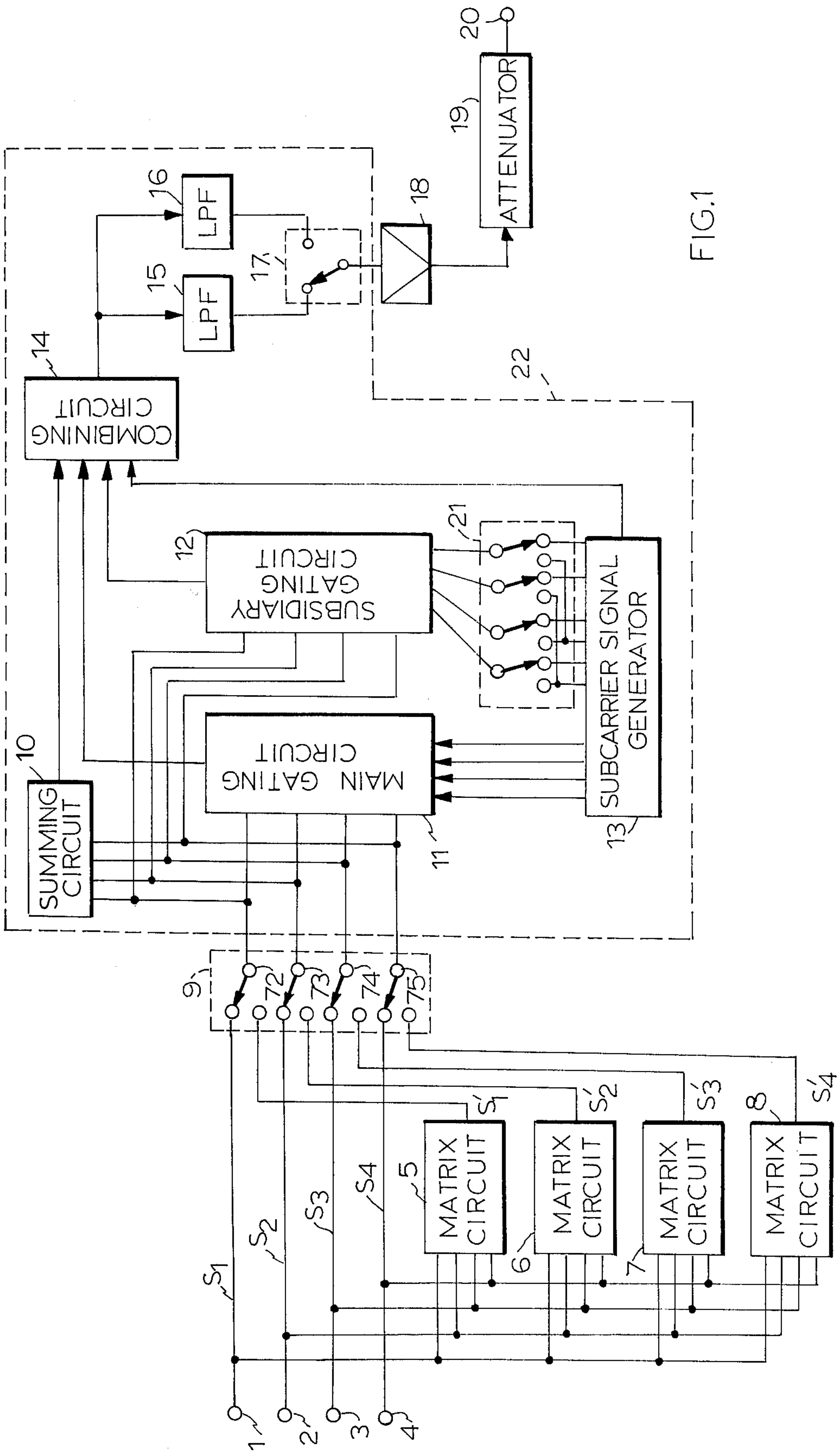
FIG. 1 is a block diagram of a preferred embodiment of an FM four channel stereo signal generator according to this invention.
Figure 2:
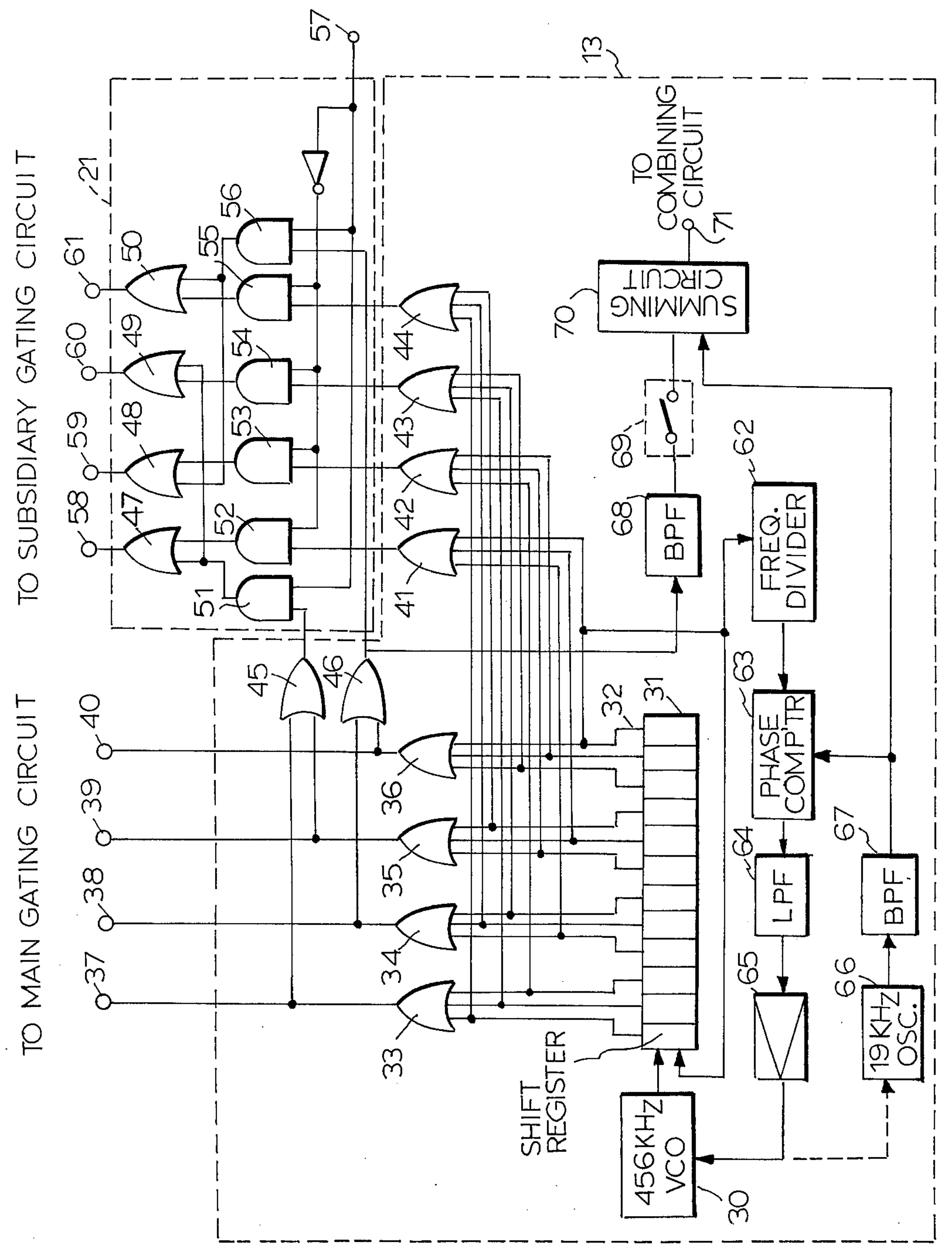
FIG. 2 is a circuit diagram, partially in block form, of a preferred form of the subcarrier signal generator 13 and the switching means 21 of FIG. 1.
Figure 3:
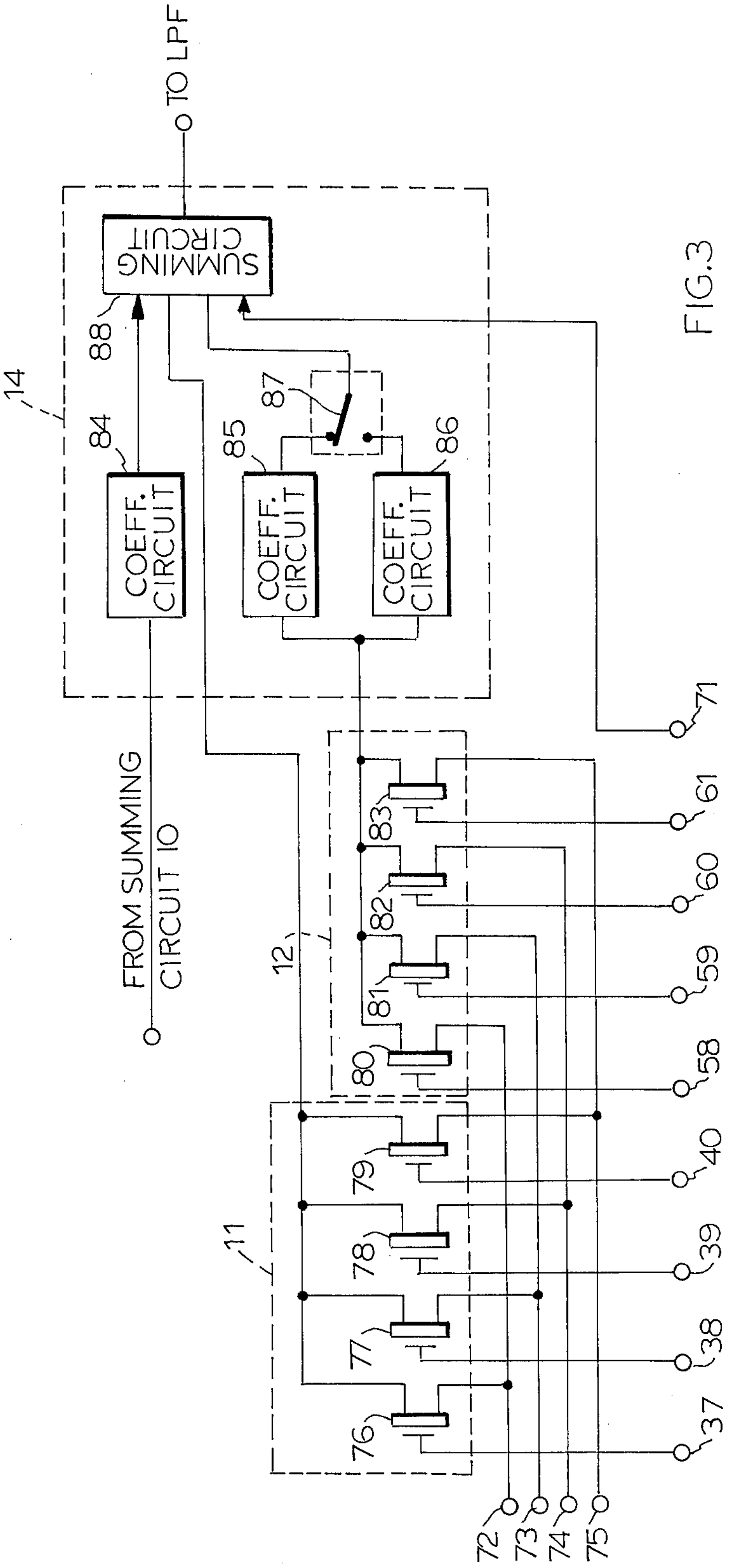

FIG. 3 is a circuit diagram, partially in block form, of a preferred form of the main and the subsidiary gating circuits 11 and 12 and the combining circuit 14 of FIG. 1;

FIG. 4 (a) to (e) are graphs showing frequency spectra of composite signals and filtering characteristics of low pass filters usable for the FM four channel stereo signal generators according to this invention;

FIG. 5 (a) to (d) are time charts of clock pulses and timing of gating by various gates used in the subcarrier signal generator 13 of FIGS. 1 or 2; and FIG. 6 is a block diagram of a preferred form of a matrixing circuit which can be used for each matrixing circuit of FIG. 1.

The same elements are designated by the same reference numerals in these Figures.

Referring to FIG. 1, reference numerals 1 to 4 designate input terminals for four stereophonically related audio signals $S_1$, $S_2$, $S_3$ and $S_4$, respectively. Reference numerals 5 to 8 designate matrixing circuits each connected at four input terminals thereof to the audio input terminals 1 to 4, respectively, for producing modified audio signals $S_1'$, $S_2'$, $S_3'$ and $S_4'$, respectively, where $S_1' = aS_1 + bS_2 + bS_3 + cS_4$ $S_2' = bS_1 + aS_2 + cS_3 + bS_4$ $S_3' = cS_1 + bS_2 + bS_3 + aS_4$ $S_4' = bS_1 + cS_2 + aS_3 + bS_4$ (2)

where *a, b* and *c* are coefficients and have a relation $2b = a + c$. These modified audio signals can be called matrixed audio signals. For obtaining these matrixed audio signals, each matrixing circuit is preferably composed of coefficient circuits and a summing circuit for simply summing the audio signals after they have been subjected to the coefficient treatment. A preferred block diagram of a matrixing circuit usable for each of the matrixing circuits 5, 6, 7 and 8 is shown in FIG. 6. Reference numerals 23 to 26 in FIG. 6 designate coefficient circuits each receiving an $S_1$, $S_2$, $S_3$ or $S_4$ audio signal and producing such an audio signal which has been modified by multiplication thereof by *a, b* or *c,* and reference numeral 27 designates a summing circuit for simply summing the thus modified audio signals (*a, b* or *c*) ($S_1$, $S_2$, $S_3$, $S_4$).

Referring back to FIG. 1, reference numeral 9 designates a switching means preferably composed of four mechanical switches as shown. Preferable mechanical switches are single-pole double-throw switches as shown. Each switch has two input terminals, one is an audio input side input terminal and the other is a matrixing circuit side input terminal. These four switches operate simultaneously for passing only the original audio signals $S_1$, $S_2$, $S_3$ and $S_4$ to the output terminals 72, 73, 74 and 75 thereof or for passing only the matrixed audio signals $S_1'$, $S_2'$, $S_3'$ and $S_4'$ to the output terminals thereof.

Reference numeral 10 designates a summing circuit for simply summing the audio signals to obtain a sum signal $(S_1+S_2+S_3+S_4)$ or $(S_1'+S_2'+S_3'+S_4')$. Reference numeral 13 designates a subcarrier signal generator for generating gating signals and pilot signals. The gating signals are first gating signals appearing at four main gating circuit side output terminals of the subcarrier signal generator, and second and third gating signals appearing at four subsidiary gating circuit side output terminals of the subcarrier signal generator. The second and the third gating signals are selectively produced at the four subsidiary gating circuit side output terminals of the subcarrier signal generator with the aid of the switching means 21. When the four matrixed audio signals are passed to the four output terminals of the switches in the switching means 9, the switching means 21 is actuated to pass the second gating signals therethrough. When the original four audio signals $S_1$, $S_2$, $S_3$ and $S_4$ are passed to the four output terminals of the switches in the switching means 9, the switching means 21 is actuated to pass the third gating signals therethrough. The first gating signals are four time sequential pulses and have a duty ratio of $\frac{1}{4}$ and a fundamental frequency of $\omega = 2\pi \times 38 \times 10^3$ rad/sec. The second gating signals are four time sequential pulses and have a duty ratio of $\frac{1}{2}$ and a fundamental frequency of $2\omega$. The third gating signals are four time sequential pulses and have a duty ratio of $\frac{1}{4}$ and a fundamental frequency of $3\omega$. Reference numeral 11 designates a main gating circuit having eight input terminals. Four input terminals thereof are connected to the output terminals 72 to 75 of the switches in the switching means 9 for receiving the original audio signals $S_1$, $S_2$, $S_3$ and $S_4$ or the matrixed audio signals $S_1'$, $S_2'$, $S_3'$ and $S_4'$, and the other four input terminals are connected to the subcarrier signal generator 13 for receiving first gating signals from the subcarrier signal generator 13. Thus, with the aid of the first gating signals, the main gating circuit gates the original audio or the matrixed audio signals to produce a main gated signal. Since first gating signals are four time sequential pulses and have a duty ratio of $\frac{1}{4}$ and a fundamental frequency of $\omega = 2\pi \times 38 \times 10^3$ rad/sec, the main gated signal is composed of a four channel stereo signal plus undesired harmonic signals. That is, the main gated signal includes a main channel signal $(S_1+S_2+S_3+S_4)$ [or $(S_1'+S_2'+S_3'+S_4')$], a first subsidiary channel signal $(S_1+S_2-S_3-S_4)\sin\omega t$ [or $(S_1'+S_2'-S_3'-S_4')\sin\omega t$], a second subsidiary channel signal $(S_1-S_2-S_3+S_4)\cos\omega t$ [or $(S_1'-S_2'-S_3'+S_4')\cos\omega t$], a third subsidiary channel signal $(S_1-S_2+S_3-S_4)\sin 2\omega t$ [or $(S_1'-S_2'+S_3'-S_4')\sin 2\omega t$], a four subsidiary channel signal $(S_1+S_2-S_3-S_4)\sin 3\omega t$ [or $(S_1'+S_2'-S_3'-S_4')\sin 3\omega t$], a fifth subsidiary channel signal $(-S_1+S_2+S_3-S_4)\cos 3\omega t$ [or $(-S_1'+S_2'+S_3'-S_4')\cos 3\omega t$], etc.

Reference numeral 12 designates a subsidiary gating circuit having eight input terminals. Four input terminals thereof are connected to the output terminals 72 to 75 of the switches in the switching means 9, and the other four input terminals are connected through a switching means 21 to the subcarrier signal generator 13 for receiving second gating signals from the subcarrier signal generator when the switch means 21 is switched to pass the second gating signals, i.e. when the matrixed audio signals are allowed to pass to the output terminals of the switches in the switching means 9. Thus, with the aid of the second gating signals, the subsidiary gating circuit gates the matrixed audio signals to produce a subsidiary gated signal. Since the second gating signals are four time sequential pulses and have duty ratio of $\frac{1}{2}$ and a fundamental frequency of $2\omega = 2\pi \times 76 \times 10^3$ rad/sec, this subsidiary gated signal is composed of a signal corresponding to the main channel signal, a signal corresponding to the negative value of third subsidiary channel signal $(-S_1+S_2-S_3+S_4)\sin 2\omega t$ for cancelling the third subsidiary channel signal and other higher frequency harmonics. When the switch means 21 is switched to pass the third gating signals, i.e. when the original audio signals are allowed to pass to the output terminals of the switches in the switching means 9, then the subsidiary gating circuit 12 receives the third gating signals. Thus, with the aid of the third gating signals, the subsidiary gating circuit gates the original audio signals $S_1$, $S_2$, $S_3$ and $S_4$ to produce a further subsidiary gated signal. Since the third gating signals are four time sequential pulses and have a duty ratio of $\frac{1}{4}$ and a fundamental frequency of $2\pi \times 114 \times 10^3$ rad/sec, this further subsidiary gated signal is composed of a signal corresponding to the main channel signal, signals corresponding to the negative values of the fourth and the fifth subsidiary channel signals $(-S_1-S_2+S_3+S_4)\sin 3\omega t$ and $(S_1-S_2-S_3+S_4)\cos 3\omega t$ for cancelling the fourth and the fifth subsidiary channel signals $(S_1+S_2-S_3-S_4)\sin 3\omega t$ and $(-S_1+S_2+S_3-S_4)\cos 3\omega t$ higher frequency harmonic components. When the equality $2b = a + c$ is achieved in the equation (2) in the case of the matrixed audio signal treatment, it is not necessary to provide the subsidiary gating circuit 12, as will be described later.

Reference numeral 14 designates a combining circuit for combining the sum signal from the summing circuit 10, the main and subsidiary gated signals from the main and subsidiary gating circuits 11 and 12 and the pilot signals from the subcarrier signal generator 13 to produce a combined signal which is composed of a complete or a quasi four channel stereo signal and other higher frequency harmonics which do not include a subsidiary channel signal nearest the four channel stereo signal. This combined signal is applied to a low pass filter 15 for a complete four channel stereo signal and a low pass filter 16 for a quasi four channel stereo signal and one or the other is selected by a switch 17 having two input terminals and one common output terminal, the two inputs being connected to the low pass filters 15 and 16, respectively. Reference numeral 18 designates an amplifier connected to the output terminal of the switch 17 and reference numeral 19 designates an attenuator connected to the output terminal of the amplifier. Thus, a final desired form of a complete or a quasi four channel stereo signal is selectively produced at an output terminal 20 of the attenuator 19. The described summing circuit 10, main and subsidiary gating circuits 11 and 12, subcarrier signal generator 13, switch means 21, combining circuit 14, low pass filters 15 and 16 and switch 17 constitute a four channel stereo signal modulation means 22.

Referring now to FIG. 2, it shows a preferred example of a circuit diagram, partially in block form, of the subcarrier signal generator 13 and the switching means 21 of FIG. 1.

Reference numeral 30 designates a voltage controlled oscillator (VCO) for oscillating a pulse of an oscillation frequency of 456 kHz. This is a first oscillator. Reference numeral 31 designates a 12 stage shift register connected to the oscillator 30 for receiving the oscillated pulse as a clock pulse. At each clock pulse, logical 1 is sequentially shifted (rightward) from the first stage to the second stage, from the second stage to the third stage, and so on, and from the last stage again to the first stage, and so on. Accordingly, time sequential pulses each having a pulse width of 1/456,000 sec and a frequency of 456,000/12=38 kHz are produced at 12 parallel output terminals of the shift register 12.

Reference numerals 33 to 36 designate OR gates each having three input terminals and one output terminal. The three input terminals of the OR gate 33 are connected to the three output terminals of the first to the third stages of the shift register 31, the three input terminals of the OR gate 34 are connected to the three output terminals of the fourth to the sixth stages of the shift register 31, and so on, as shown. Thus, four time sequential pulses each having a pulse width of 3/456,000 sec and a frequency of 38 kHz are produced at the four output terminals of the OR gates 37, 38, 39 and 40, respectively. These output terminals 37 to 40 are connected to the main gating circuit 11.

Reference numerals 41 to 44 designate OR gates each having three input terminals and one output terminal. The three input terminals of the OR gate 41 are connected to the output terminals of the fourth, eighth and twelfth stages of the shift register 31, respectively, as shown; the three input terminals of the OR gate 42 are connected to the output terminals of the third, seventh and eleventh stages of the shift register 31, respectively as shown; the three input terminals of the OR gate 43 are connected to the output terminals of the second, sixth and tenth stages of the shift register 31, respectively, as shown; and the three input terminals of the OR gate 44 are connected to the output terminals of the first, fifth and ninth stages of the shift register 31, respectively, as shown. Thus, output signals of every four stages of the shift register 31 are sequentially selected by the OR gates 41 to 44 in a sequence from the OR gate 44 to 43 to 42 to 41, contrary to the sequence of the selection by the OR gates 33 to 36 which is from 33 to 34 to 35 to 36. Thus, four time sequential pulses each having a pulse width of 1/456,000 sec and a frequency of 456,000/4=114 kHz are produced at the output terminals of the OR gates 41 to 44, respectively.

Reference numeral 45 designates an OR gate having one output terminal and two input terminals which are connected to the output terminals of the OR gates 33 and 35, respectively. Reference numeral 46 designates an OR gate having one output terminal and two input terminals which are connected to the output terminals of the OR gates 34 and 36, respectively. This, two time sequential pulses each having a pulse width of 3/456,000 sec and a frequency of 76 kHz are produced at the output terminals of the OR gates 45 and 46, respectively. The phases of the output signals of the OR gates 45 and 46 are opposite to each other.

The switch means 21 comprises four OR gates 47 to 50 and six AND gates 51 to 56 each having two input terminals and one output terminal and an inverter having one input and one output terminal. Reference numeral 57 designates a control terminal which is connected to the input terminal of the inverter and to which a logical 1 and 0 are applied for actuating the switching means 21 for producing a quasi and a complete four channel stereo signals, respectively. One input terminal of and AND gate 51 is connected to the output terminal of the OR gate 45 and the other input terminal is connected to the control terminal 57, and the output terminal of the AND gate 51 is connected to one input terminal of the OR gate 47 and one input terminal of the OR gate 49. One input terminal of the AND gate 52 is connected to the output terminal of the OR gate 41 and the other input terminal is connected to the output terminal of the inverter, and the output terminal of the AND gate 52 is connected to the other input terminal of the OR gate 47. One input terminal of the AND gate 53 is connected to the output terminal of the OR gate 42 and the other input terminal is connected to the output terminal of the inverter, and the output terminal of the AND gate 53 is connected to one input terminal of the OR gate 48. One input terminal of the AND gate 54 is connected to the output terminal of the OR gate 43 and the other input terminal is connected to the output terminal of the inverter, and the output terminal of the AND gate 54 is connected to the other input terminal of the OR gate 49. One input terminal of the AND gate 55 is connected to the output terminal of the OR gate 44 and the other input terminal is connected to the output terminal of the inverter, and the output terminal of the AND gate 55 is connected to one input terminal of the OR gate 50. One input terminal of the AND gate 56 is connected to the output terminal of the OR gate 46 and the other input terminal is connected to the control terminal 57 and the output terminal of the AND gate 56 is connected to the other input terminal of the OR gate 48 and the other input terminal of the OR gate 50. Thus, when the logical 1 is applied to the control terminal 57, the output signal of the OR gate 45 is transferred to the output terminals 58 and 60 of the switch means 21 and the output signal of the OR gate 46 is transmitted to the output terminals 59 and 61 of the switch means 21. When the logical 0 is applied to the control terminal 57, the output signals of the OR gates 41 to 44 are transferred to the output terminals 58 to 61 of the switch means 21. These output terminals 58 to 61 are connected to the subsidiary gating circuit 12. FIG. 5 (a) shows a time chart of the clock pulse of the shift register 12; FIG. 5(b) shows the timing of the gating at the output terminals 37 to 40 at logical 1; FIG. 5(c) shows the timing of the gating at the output terminals 58 to 61 at the logical 1 with the control signal applied to the control terminal 57 being logical 0; and FIG. 5(d) shows the timing of gating at the output terminals 58 to 61 at the logical 1 with the control signal applied to the control terminal 57 being logical 1.

Referring again to FIG. 2, the output signal at the last (twelfth) stage of the shift register is applied to an input terminal of the shift register and also to a ½ frequency divider 62. The output signal of the ½ frequency divider 62 is applied to a phase comparator 63. The phase comparator 63 compares the phase of the output signal of the ½ frequency divider 62 and the output signal of a bandpass filter 67. Reference numeral 66 designates a stable 19 kHz oscillator and this oscillated 19 kHz signal is passed through the bandpass filter 67 to become a pure sinusoidal signal. This is the output signal to be applied to the phase comparator 63. The oscillator 66 is a second oscillator. The output signal of the phase comparator 63 is passed through a low pass filter 64 and is then applied to an amplifier 65. The output signal of the amplifier is fed to the 456 kHz VCO 30. Thus, the ½ frequency divider 62, phase comparator 63, low pass filter 64, amplifier 65, 456 kHz VCO 30 and the shift register 31 constitute a phase locked loop. The pure sinusoidal signal from the band pass filter 67 is also applied as a first pilot signal to an input terminal of a summing circuit 70. Thus, the signals produced from the phase locked loop are locked in phase with the first pilot signal. Thus the gating signals and hence the subcarrier signal, and the first pilot signal are always kept in phase with each other. Reference numeral 68 designates a bandpass filter which receives the output signal of the OR gate 46 to produce a pure sinusoidal 76 kHz signal. This signal can be used as a second pilot signal for a complete four channel stereo signal. The output signal, i.e. 76 kHz signal, of the band pass filter is applied directly, or through a switch 69, to the other input terminal of the summing circuit 70. The summing circuit 70 simply sums up the first and the second pilot signals when these pilot signals are applied thereto. The output terminal 71 of the summing circuit is connected to the combining circuit 14. In addition, the output signal of the amplifier 65 can be fed to the 19 kHz oscillator 66 rather than to the 456 kHz VCO 30 as shown by a dashed feed line if the 19kHz oscillator is set to be a VCO.

Referring now to FIG. 3, there are shown a circuit diagram, partially in block form, of a preferred example of the main and the subsidiary gating circuits 11 and 12 and the combining circuit 14 of FIG. 1.

Reference numerals 37 to 40 and 58 to 71 are output terminals of the subcarrier signal generator 13. The main gating circuit 11 is composed of four field effect transistors (FET) 76 to 79. The drain electrodes of these FET's 76 to 79 are connected to each other and also connected to an input terminal of a summing circuit 88 in the combining circuit 14. The source electrodes of these FET's 76 to 79 are connected to the output terminals 72 to 75 of the switches in the switching means 9, respectively, so as to receive the original audio or the matrixed audio signals. The gate electrodes of the FET's 76 to 79 are connected to the terminals 37 to 40, respectively, so as to receive the first gating signals (pulses) the timing of which is shown by FIG. 5(b).

Similarly, the subsidiary gating circuit 12 is composed of four FET's 80 to 83. The drain electrodes thereof are connected to each other. The source electrodes of the FET's 80 to 83 are connected to the output terminals 72 to 75 of the switches in the switching means 9, respectively, and the gate electrodes of the FET's are connected to the terminals 58 to 61, respectively, so as to receive the second or third gating signals (pulses) the timing of which is as shown by FIG. 5(d) or FIG. 5(c), respectively.

Reference numeral 84 designates a coefficient circuit, the coefficient of which can be optionally chosen and is preferably $(3-\pi)/3\pi$ for reasons as will be described later, for adjusting the amplitude of the output signal (sum signal) of the summing circuit with the chosen coefficient.

Reference numeral 85 designates a coefficient circuit, the coefficient of which is preferably ⅓ for reasons as will be set forth later, and is connected at its input terminal to the drain electrodes of the FET's 80 to 83 for adjusting the amplitude of the output signal of the subsidiary gating circuit 12 for a complete four channel stereo signal. Reference numeral 86 designates a coefficient circuit, the coefficient of which is preferably ½ for reasons as will be set forth later, and is connected at its input terminal to the drain electrodes of the FET's 80 to 83 for adjusting the amplitude of the output signal of the subsidiary gating circuit 12 for a quasi four channel or two channel stereo signal. Reference numeral 87 is a switch for connecting the coefficient circuits 85 and 86 selectively to one input terminal of the summing circuit 88 for a complete four channel stereo signal and for a quasi four or two channel stereo signal, respectively. The summing circuit 88 simply sums up the output signals of the coefficient circuit 84, coefficient circuit 85 or 86 and summing circuit 70. The output signal (sum signal) of the summing circuit 88 is applied to the low pass filter 15 or 16 for obtaining a complete or a quasi four channel stereo signal.

Hereinafter, a more detailed operation of the four channel stereo signal modulation means will be described.

For a complete four channel stereo signal, i.e. in the case when the switching means 9 produces at the output terminals thereof the original audio signals $S_1$, $S_2$, $S_3$ and $S_4$, the output signal (main gated signal) of the main gating circuit 11 becomes:

$$\tfrac{1}{4}A + (1/\pi)B\sin\omega t + (1/\pi)C\cos\omega t + (1/\pi)D\sin 2\omega t + (1/3\pi)B\sin 3\omega t - (1/3\pi)C\cos 3\omega t + \ldots \quad (3)$$

Meanwhile, in this case, third gating signals which are shown in FIG. 5(c) are applied to the subsidiary gating circuit 12 from the subcarrier signal generator 13. Therefore, the output signal of the coefficient circuit 85 is:

$$(1/12)A - (1/3\pi)B\sin 3\omega t + (1/3\pi)C\cos 3\omega t + \ldots \quad (4)$$

When the coefficient of the coefficient circuit 84 is $(3-\pi)/3\pi$, the output signal of the coefficient circuit 84 is:

$$[(3-\pi)/3\pi]A \qquad (5)$$

The output signal of the summing circuit 88, except for the pilot signals, is obtained by adding the signals (3) to (5), and is thus:

$$(1/\pi)(A+B\sin\omega t+C\cos\omega t+D\sin 2\omega t)+(1/5)\pi\ B\sin 5\omega t+(1/5\pi)\ C\cos 5\omega t+\ldots \qquad (6)$$

It is thus clear that the fourth and the fifth subsidiary channel signals have been cancelled. FIG. 4 (a) shows the signal expressed by the equation (1) with harmonic components of sin $5\omega t$ and cos $5\omega t$, and FIG. 4 (b) shows the signal expressed by equation (6). It is clear that in the case of FIG. 4 (b) the nearest (lowest) spurious signal to the $2\omega$ band is the $5\omega$ band, and that a low pass filter having a gradually sloping cut off such as shown by the solid curve of FIG. 4 (c) can be used for the low pass filter 15 if it sufficiently attenuates harmonics of the $5\omega$ band, and it is not necessary for the low pass filter 15 to have such an extremely sharp cut off as shown by the dotted curve of FIG. 4 (c). If such a conventional low pass filter as shown by the solid curve of FIG. 4 (c) is used, it does not cause the deterioration of the main, first subsidiary, second subsidiary and third subsidiary channel signals with respect to the amplitude and phase thereof.

For a quasi four channel stereo signal, i.e. in the case when the switching means 9 produces at the output terminals thereof the matrixed audio signals $S_1'$, $S_2'$, $S_3'$ and $S_4'$, the output signal (main gated signal) of the main gating circuit 11 becomes:

$$\tfrac{1}{4}A'+(1/\pi)B'\sin\omega t+(1/\pi)C'\cos\omega t+(1/\pi)D'\sin 2\omega t+(1/3\pi)B'\sin 3\omega t+\ldots \qquad (7)$$

Where $$A'=S_1'+S_2'+S_3'+S_4'$$

$$B'=S_1'+S_2'-S_3'-S_4'$$

$$C'=S_1'-S_2'-S_3'+S_4'$$

$$D'=S_1'-S_2'+S_3'-S_4' \qquad (7')$$

Meanwhile, in this case, second gating signals which are shown by FIG. 5 (d) are applied to the subsidiary gating circuit 12 from the subcarrier signal generator 13. Therefore, the output signal of the coefficient circuit 86 is:

$$\tfrac{1}{4}A'-(1/\pi)D'\sin 2\omega t+\ldots \qquad (8)$$

When the coefficient of the coefficient circuit 84 is $(3-\pi)/3\pi$, the output signal of the coefficient circuit 84 is:

$$[(3-\pi)/3\pi]A' \qquad (9)$$

The output signal of the summing circuit 88, except for the pilot signals, is obtained by adding the signals (7) to (9), and is thus:

$$[\tfrac{1}{4}+\tfrac{1}{4}+(3-\pi)/3\pi]A'+(1/\pi)B'\sin\omega t+(1/\pi)C'\cos\omega t+(1/3/90)B'\sin 3\omega t+\ldots \qquad (10)$$

It is thus clear that the third subsidiary channel signal ($2\omega$ band signal) has been cancelled.

Now, it should be noted that if the condition $2b=a+c$ is maintained, then $D'=S_1'-S_2'+S_3'-S_4'=aS_1+bS_2+bS_3+cS_4-bS_1-aS_2-cS_3-bS_4+cS_1+bS_2+bS_3aS_4-bS_1-cS_2-aS_3-bS_4=0$. Thus, for the quasi four channel stereo signal, the subsidiary channel signal can be cancelled without the need for the subsidiary gating circuit 12. However, it is rather difficult to adjust the coefficients a, b and c of the matrixing circuits 5 to 8 to have a relation such that $2b$ is equal exactly to a+c. If $2b$ is not exactly equal to $a+c$, then D' is not exactly zero. Thus, for achieving more accurate cancellation of the third subsidiary channel signal, the subsidiary gating circuit 12 is used in this preferred embodiment for the quasi four channel stereo signal also (not only for the complete four channel stereo signal).

In the case when the subsidiary gating circuit 12 is used for cancelling the third subsidiary channel signal for a quasi four channel stereo signal, it is preferred that signal level (amplitude) of the composite signal in the case of quasi four channel stereo signal is made equal to that for a complete four channel stereo signal. For this purpose, by using the equations (7'), (2') and (1'), the signal (10) can be re-expressed by:

$$[\tfrac{1}{4}+(3-\pi)/3\pi]\ (a+2b+c)A+(1/\pi)(a-c)B\sin\omega t+(1/\pi)(a-c)C\cos\omega t+(1/3\pi)(a-c)B\sin 3\omega t+\ldots \qquad (11)$$

Thus, it is clear that if $[\tfrac{1}{4}+(3-\pi)/3\pi](a+2b+c)=(1/\pi)$ and $a-c=1$, the desired level (amplitude) equalization is achieved. From the simultaneous equations $[\tfrac{1}{4}+3-\pi/3\pi\ ](a+2b+c)=(1/\pi)$, $a-c=1$ and $2b=a+c$, the $a$, $b$ and $c$ values which satisfy these three equations are obtained:

$$a=\frac{\pi+9}{2(\pi+6)}$$

$$b=\frac{3}{2(\pi+6)}$$

$$c=\frac{-(\pi+3)}{2(\pi+6)}$$

Thus, under these conditions, the signal (11) can be re-expressed by:

$$(1/\pi)(A+B\sin\omega t+C\cos\omega t)+(1/3\pi)B\sin 3\omega t+\ldots \qquad (12)$$

Figures 4A, 4B, 4C, 4D, 4E:
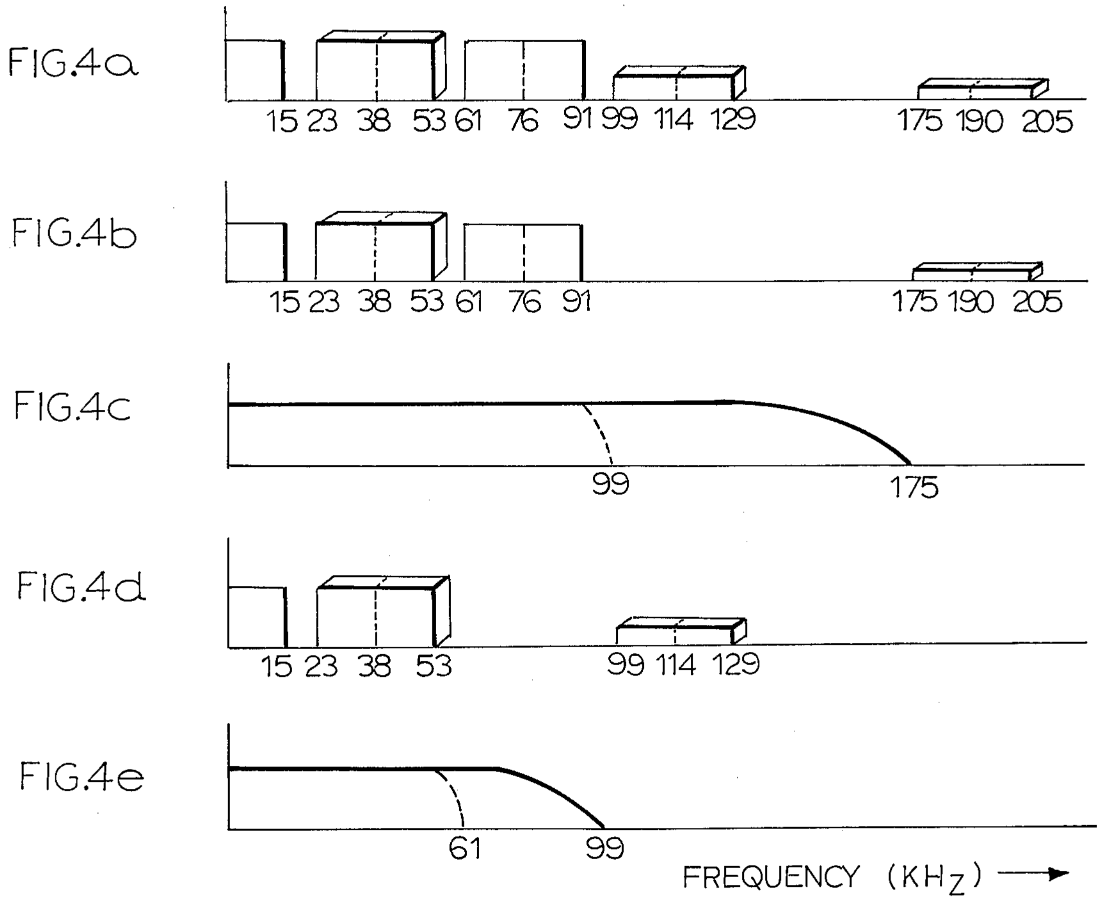

FIG. 4(d) shows the frequency spectra of the signal (12). It is clear that in the case of FIG. 4(d), the nearest (lowest) spurious signal to the $\omega$ band is the $3\omega$ band, and that a low pass filter having a gradually sloping cut off such as shown by the solid curve of FIG. 4(e) can be used for the low pass filter 16 if it sufficiently attenuates harmonics the $3\omega$ band, and it is not necessary for the low pass filter 16 to have such an extremely sharp cut off as shown by the dotted curve of FIG. 4(e). If a conventional low pass filter such as shown by the solid curve of FIG. 4(e) is used, it does not cause deterioration of the main, first subsidiary and second subsidiary channel signals with respect to the amplitude and phase thereof.

As is evident from the foregoing description, the features of this invention are: the provision of matrixing circuits to produce the matrixed audio signals for obtaining a quasi four channel stereo signal; the provision of means to cancel spurious signals; the provision of high quality complete and quasi four channel stereo signals which can be selectively produced easily; and the provision of means to produce pilot signals of high phase accuracy which are to be added to the four channel stereo signal. The matrixing circuits modify the four original stereophonically related audio signals with coefficients $a$, $b$ and $c$ under the condition that $2b=a+c$ for a quasi four channel stereo signal so as to suppress the unwanted $2\omega$ (76 kHz) band signal. Further, a possible remaining $2\omega$ band signal when the equation $2b=a+c$ is not completely satisfied, is cancelled by using a subsidiary gating circuit. Sufficient suppression of the $2\omega$ band signal (which is a spurious signal in a quasi four channel stereo signal) prevents interference between the $2\omega$ band signal and the SCA band. Further, the subsidiary gating circuit can be used for the cancellation of the $3\omega$ band signal (harmonic) when producing a complete four channel stereo signal.

In addition, by setting $a=(\pi+9)/2(\pi+6)$, $b=3/2(\pi+6)$ and $c=-(\pi+3)/2(\pi+6)$, not only can the $2\omega$ band signal be suppressed but also amplitude equalization between the complete four channel stereo signal and the quasi four channel stereo signal can be achieved.

Thus, the four channel stereo signal generator of this invention can selectively produce complete four channel and quasi four channel stereo signals easily and with high quality and with the same signal levels. Further, since the four channel stereo signal generator of this invention is based on a time division multiplex method, and since a conventional filter having a gradually sloped cut off can be used for suppressing spurious higher frequency harmonics, the resultant signals are superior with respect to phase and amplitude. The pilot signal is preferably has high phase accuracy so as to obtain resultant high quality signals. For this purpose, a phase locked loop is introduced in the four channel stereo signal generator of this invention for maintaining an accurate phase relation between the subcarrier and the pilot signal even under changes of ambient temperature and circuit constants.

As many apparently widely different embodiments of this invention may be made without departing from the spirit and scope thereof, it is to be understood that this invention is not limited to the specific embodiments thereof as set forth hereinbefore, except as defined in the appended claims.

What is claimed is:

1. An FM four channel stereo signal generator comprising:

a first, a second, a third and a fourth audio input terminal to which four stereophonically related audio signals $S_1$, $S_2$, $S_3$ and $S_4$ are applied, respectively;

a first, a second, a third and a fourth matrixing circuit, each having an output terminal and four input terminals connected to said four audio input terminals, for producing matrixed audio signals $S_1'=(aS_1+bS_2+bS_3+cS_4)$, $S_2'=(bS_1+aS_2+cS_3+bS_4)$, $S_3'=(cS_1+bS_2+bS_3+aS_4)$ and $S_4'=(bS_1+cS_2+aS_3+bS_4)$, respectively, where $a$, $b$ and $c$ are coefficients and are in the relation $2b=a+c$; and a four channel stereo signal modulation means operatively connected to said four matrixing circuits and including (i) a subcarrier signal generator for producing gating signals of four time sequential pulses having a duty ratio $\frac{1}{4}$ and a fundamental frequency $\omega=2\pi\times38\times10^3$ rad/sec, and (ii) a gating circuit operatively connected to said four matrixing circuits for gating said four matrixed audio signals with the aid of said gating signals so as to produce a main channel signal $(S_1'+S_2'+S_3'+S_4')$, a first subsidiary channel signal signal $(S_1'+S_2'-S_3'-S_4')\sin\omega t$, a second subsidiary channel signal $(S_1'-S_2'-S_3'+S_4')\cos\omega t$ and a third subsidiary channel signal $(S_1'-S_2'+S_3'-S_4')\sin 2\omega t$, thereby $(S_1'-S_2'+S_3'-S_4')$ being zero under said condition $2b=a+c$.

2. An FM four channel stereo signal generator comprising:

a first, a second, a third and a fourth audio input terminal to which four stereophonically related audio signals $S_1$, $S_2$, $S_3$ and $S_4$ are applied, respectively;

a first, a second, a third and a fourth matrixing circuit, each having an output terminal and four input terminals connected to said four audio input terminals, for producing matrixed audio signals $(aS_1+bS_2+bS_3+cS_4)$, $(bS_1+aS_2+cS_3+bS_4)$, $(cS_1+bS_2+bS_3+aS_4)$ and $(bS_1+cS_2+aS_3+bS_4)$, respectively, where $a$, $b$ and $c$ are coefficients and are in the relation $2b=a+c$;

a first, a second, a third and a fourth switch, each having an output terminal and an audio input side input terminal and a matrixing circuit side input terminal, said audio input side input terminals of said first, second, and fourth switches being connected to said first, second, third and fourth audio input terminals, respectively, and said matrixing circuit side input terminals of said first, second, third and fourth switches being connected to said output terminals of said first, second, third and fourth matrixing circuits, respectively, for switching the output signals of said switches from said audio signals $S_1$, $S_2$, $S_3$ and $S_4$ to said matrixed audio signals and vice versa; and a four channel stereo signal modulation means operatively connected to said four output terminals of said switches and comprising (1) a subcarrier signal generator which generates first gating signals of four time sequential pulses having a duty ratio $\frac{1}{4}$ and a fundamental frequency $\omega=2\pi\times38\times10^3$ rad/sec at four main gating circuit side output terminals thereof and also generates second gating signals of four time sequential pulses having a duty ratio $\frac{1}{4}$ and a fundamental frequency $2\omega$ at four subsidiary gating circuit side output terminals thereof when said four matrixed audio signals are passed to said four output terminals of said switches and also generates third gating signals of four time sequential pulses having a duty ratio $\frac{1}{4}$ and a fundamental frequency $3\omega$ at said four subsidiary gating circuits thereof when said four audio signals $S_1$, $S_2$, $S_3$ and $S_4$ are passed to said four output terminals of said switches, (2) a main gating circuit connected to said four output terminals of said switches and receiving said first gating signals for gating the output signals of said switches with the aid of said first gating signals so as to produce a main gated signal at output terminal thereof, (3) a subsidiary gating circuit connected to said four output terminals of said switches and receiving said second gating signals for gating the output signals of said switches with the aid of said second gating signals so as to produce subsidiary gated signals at an output terminal thereof, (4) a summing circuit connected to said four output terminals of said switches for producing at an output terminal thereof a sum signal which is a simple sum of the output signals of said switches, (5) a combining circuit connected to said output terminals of said summing circuit, main gating circuit and subsidiary gating circuit for combining said sum signal, main gated signal and subsidiary gated signal so as to produce a composite signal including (a) a stereo signal $(S_1+S_2+S_3+S_4)$ + $(S_1+S_2-S_3-S_4)$ $\sin\omega t+(S_1-S_2-S_3+S_4)$ $\cos\omega t$ when said four matrixed audio signals are passed to said four output terminals of said switches and (b) a stereo signal $(S_1+S_2+S_3+S_4)$ + $(S_1+S_2-S_3-S_4)$ $\sin\omega t$ + $(S_1-S_2-S_3+S_4)$ $\cos\omega t$ + $(S_1-S_2+S_3-S_4)\sin 2\omega t$ when said audio signals $S_1$, $S_2$, $S_3$ and $S_4$ are passed to said four output terminals of said switches, and (5) a low pass filter connected to said combining circuit for attenuating undesired higher frequency signal components included in said composite signal for producing a four channel stereo signal.

3. An FM four channel stereo signal generator according to claim 2, wherein said $a=[\pi+9/2(\pi+6)]$, $b=[3/2(\pi+6)]$, and $c=[-(\pi+3)/2(\pi+6)]$.

* * * * *